US012716167B2

(12) United States Patent
Hartnett

(10) Patent No.: US 12,716,167 B2
(45) Date of Patent: Aug. 25, 2026

(54) THERMAL STORAGE MECHANISM FOR A LAUNDRY APPLIANCE THAT UTILIZES RECOVERY HEAT AND RENEWABLE ENERGY SOURCES

(71) Applicant: WHIRLPOOL CORPORATION, Benton Harbor, MI (US)

(72) Inventor: Christopher Aidan Hartnett, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 891 days.

(21) Appl. No.: 18/098,261

(22) Filed: Jan. 18, 2023

(65) Prior Publication Data

US 2023/0265600 A1 Aug. 24, 2023

Related U.S. Application Data

(60) Provisional application No. 63/312,133, filed on Feb. 21, 2022.

(51) Int. Cl.
*D06F 58/26* (2006.01)
*D06F 58/20* (2006.01)
*F26B 23/00* (2006.01)

(52) U.S. Cl.
CPC ............ *D06F 58/26* (2013.01); *D06F 58/206* (2013.01); *F26B 23/002* (2013.01)

(58) Field of Classification Search
CPC ....... D06F 58/26; D06F 58/206; D06F 23/002
USPC ............................................ 34/86, 595–610
See application file for complete search history.

(56) References Cited

U.S. PATENT DOCUMENTS 2,975,623 A * 3/1961 Eichhorn ................ D06F 25/00 68/16
4,250,866 A 2/1981 Telkes
5,131,169 A 7/1992 Jaster
5,709,041 A 1/1998 Tarplee
7,055,262 B2 6/2006 Goldberg et al.
7,513,132 B2 4/2009 Wright et al.
7,665,225 B2 2/2010 Goldberg et al.
8,915,104 B2 12/2014 Beihoff et al.
9,027,371 B2 5/2015 Beihoff et al.
9,389,018 B2 7/2016 Paderno et al.
9,752,275 B2 9/2017 Stolze et al.
(Continued)

FOREIGN PATENT DOCUMENTS

CN 107641929 A 1/2018
DE 4403737 A1 8/1995
(Continued)

*Primary Examiner* — Stephen M Gravini
(74) *Attorney, Agent, or Firm* — Price Heneveld LLP

(57) ABSTRACT

A laundry appliance includes a blower that directs process air through an airflow path. A rotating drum holds articles to be processed. A heat pump system has a condenser and an evaporator. The evaporator dehumidifies the process air that is delivered from the drum and the condenser heats the process air that is delivered from the evaporator. A thermal storage mechanism retains heat at least from the condenser that is directed away from the process air to define captured heat, and the captured heat of the thermal storage mechanism is utilized during a subsequent laundry cycle. A secondary heater is powered by an external source that delivers thermal energy to the thermal storage mechanism.

20 Claims, 7 Drawing Sheets

(56) References Cited

U.S. PATENT DOCUMENTS

| | | | | |
|---|---|---|---|---|
| 9,833,120 | B2 * | 12/2017 | Vallejo Noriega | A47L 15/4285 |
| 10,273,628 | B2 * | 4/2019 | Je | D06F 58/50 |
| 10,400,385 | B2 * | 9/2019 | Brown | D06F 58/26 |
| 11,053,631 | B2 * | 7/2021 | Kim | D06F 25/00 |
| 11,697,902 | B2 * | 7/2023 | Leibman | D06F 58/04 34/603 |
| 11,718,949 | B2 * | 8/2023 | Kim | D06F 58/206 34/427 |
| 12,435,462 | B2 * | 10/2025 | Ryoo | D06F 58/206 |
| 2005/0091755 | A1 | 5/2005 | Conrad et al. | |
| 2005/0092352 | A1 | 5/2005 | Luckman et al. | |
| 2009/0300941 | A1 | 12/2009 | Stolze | |
| 2011/0220331 | A1 | 9/2011 | Fochem et al. | |
| 2011/0277334 | A1 | 11/2011 | Lee et al. | |
| 2012/0131811 | A1 * | 5/2012 | Del Pos | D06F 58/18 34/73 |
| 2012/0210597 | A1 | 8/2012 | Bison et al. | |
| 2013/0047456 | A1 | 2/2013 | Balioglu et al. | |
| 2014/0096798 | A1 | 4/2014 | Gaus et al. | |
| 2014/0310976 | A1 | 10/2014 | Paderno et al. | |
| 2017/0042402 | A1 | 2/2017 | Gaus et al. | |
| 2018/0209737 | A1 | 7/2018 | Lv et al. | |
| 2020/0121157 | A1 | 4/2020 | Vallejo et al. | |
| 2023/0265598 | A1 * | 8/2023 | Masters, Jr. | D06F 58/30 34/523 |
| 2023/0265600 | A1 * | 8/2023 | Hartnett | D06F 58/26 34/86 |
| 2024/0301615 | A1 * | 9/2024 | Bellinger | D06F 58/44 |
| 2026/0015785 | A1 * | 1/2026 | Hartnett | D06F 58/206 |

FOREIGN PATENT DOCUMENTS

| | | | | | |
|---|---|---|---|---|---|
| DE | 102009049066 | A1 | | 4/2011 | |
| DE | 102013223917 | A1 | | 6/2014 | |
| EP | 2327350 | A1 | | 6/2011 | |
| EP | 2327351 | A1 | | 6/2011 | |
| EP | 2327825 | A1 | | 6/2011 | |
| EP | 2347308 | A1 | | 7/2011 | |
| EP | 2992132 | A1 | | 3/2016 | |
| EP | 4230787 | A1 | * | 8/2023 | D06F 58/206 |
| FR | 2934485 | A1 | | 2/2010 | |
| KR | 20210062210 | A | * | 5/2021 | D06F 58/38 |
| WO | 2007004176 | A1 | | 1/2007 | |
| WO | 2011039251 | A1 | | 4/2011 | |
| WO | 2011091940 | A1 | | 8/2011 | |
| WO | 2013124163 | A2 | | 8/2013 | |
| WO | 2013174739 | A1 | | 11/2013 | |
| WO | 2014177192 | A1 | | 11/2014 | |
| WO | 2016188255 | A1 | | 12/2016 | |
| WO | WO-2021101301 | A1 | * | 5/2021 | D06F 58/38 |

* cited by examiner

THERMAL STORAGE MECHANISM FOR A LAUNDRY APPLIANCE THAT UTILIZES RECOVERY HEAT AND RENEWABLE ENERGY SOURCES

CROSS-REFERENCE TO RELATED APPLICATION

This application claims priority to and the benefit under 35 U.S.C. § 119(e) of U.S. Provisional Patent Application No. 63/312,133, filed on Feb. 21, 2022, entitled THERMAL STORAGE MECHANISM FOR A LAUNDRY APPLIANCE THAT UTILIZES RECOVERY HEAT AND RENEWABLE ENERGY SOURCES, the entire disclosure of which is hereby incorporated herein by reference.

BACKGROUND OF THE DISCLOSURE

The present disclosure generally relates to laundry appliances, and more specifically, to laundry appliances that include thermal storage mechanisms for storing thermal energy produced by various heaters within the appliances and utilizing this captured heat at a later time. The device also relates to the use of renewable energy sources for delivering electrical or thermal energy to the appliance or thermal storage mechanism.

SUMMARY OF THE DISCLOSURE

According to an aspect of the present disclosure, a laundry appliance includes a blower that directs process air through an airflow path. A rotating drum holds articles to be processed. A heat pump system has a condenser and an evaporator. The evaporator dehumidifies the process air that is delivered from the drum and the condenser heats the process air that is delivered from the evaporator. A thermal storage mechanism retains heat at least from the condenser that is directed away from the process air to define captured heat, and the captured heat of the thermal storage mechanism is utilized during a subsequent laundry cycle. A secondary heater is powered by an external source that delivers thermal energy to the thermal storage mechanism.

According to another aspect of the present disclosure, a laundry appliance includes a blower that directs process air through an airflow path. A rotating drum holds articles to be processed. A heating assembly delivers heat to the process air that is delivered to the rotating drum. A phase change material retains heat at least from the heating assembly that is directed away from the process air to define captured heat. The captured heat of the phase change material is utilized during a subsequent laundry cycle. A secondary heater is powered by an external source that delivers thermal energy to the phase change material.

According to another aspect of the present disclosure, a method for operating a laundry appliance includes the steps of activating a blower for delivering process air to a processing space, activating a primary heating element, capturing excess thermal energy from the primary heating element within a phase change material, further charging the phase change material through accumulating captured heat from an external source within the phase change material, storing the captured heat within the phase change material for a period of time, activating a subsequent drying cycle, and delivering the captured heat from the phase change material into the process air for operating the subsequent drying cycle.

These and other features, advantages, and objects of the present disclosure will be further understood and appreciated by those skilled in the art by reference to the following specification, claims, and appended drawings.

Figure 1:
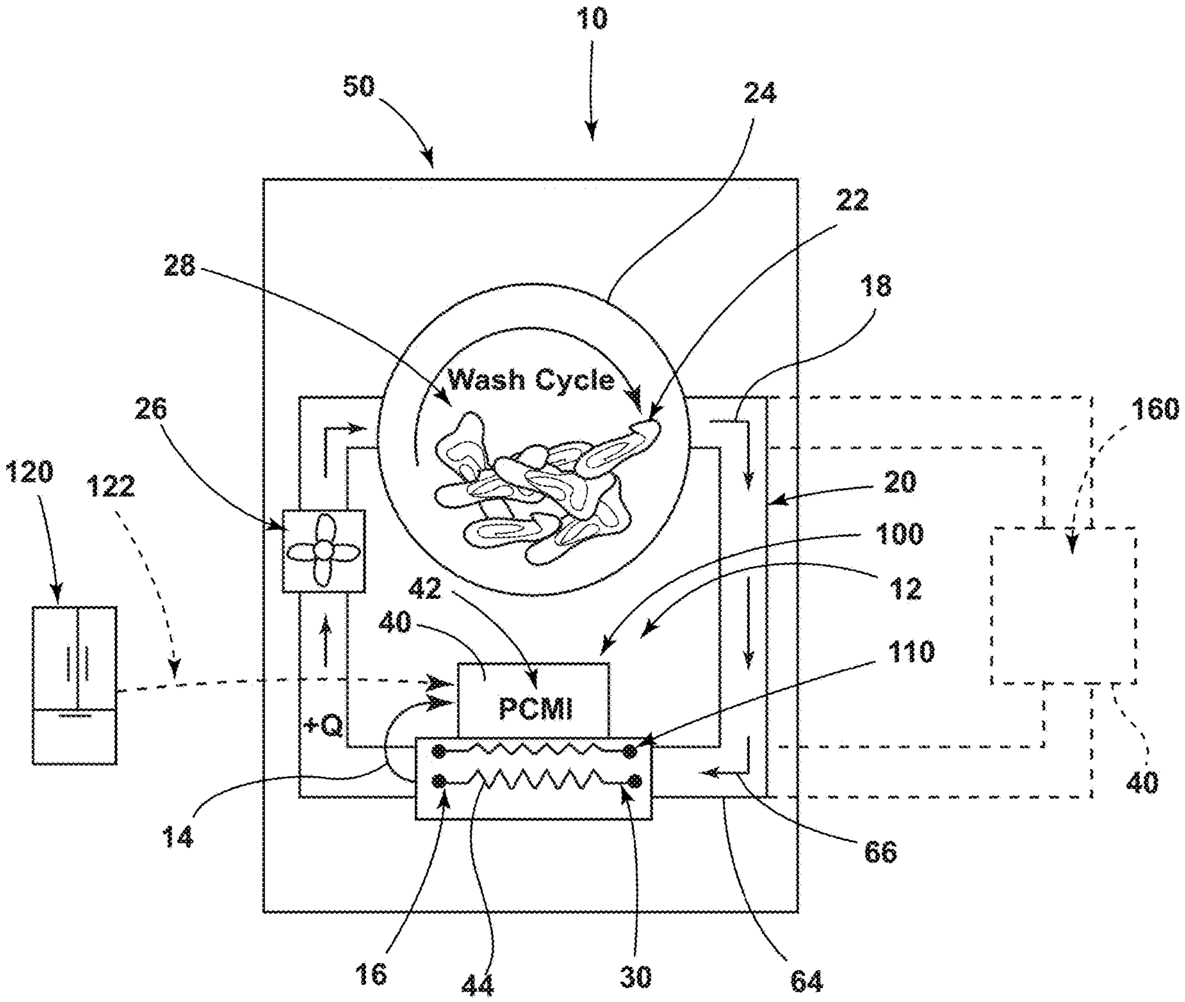
FIG. 1 is a schematic diagram illustrating a laundry appliance that incorporates a phase change material of a thermal storage mechanism that is placed in thermal communication with a heat source of the appliance.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance that utilizes a thermal storage mechanism for capturing excess heat with one or more heating elements for providing supplemental heat to process air for treating laundry and where the thermal storage mechanism is at least partially charged using externally sourced renewable energy. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4 and 6-7, reference numeral 10 generally refers to a laundry appliance that includes a thermal storage mechanism 12 for capturing excess thermal energy 14 produced by a heating assembly that includes one or more heating elements 16 within the laundry appliance 10. The heating elements 16 and the thermal storage mechanism 12 are utilized for elevating a temperature of process air 18 that is moved through an airflow path 20. This process air 18 is used for extracting moisture from articles 22 being processed in a drum 24. The process air 18 is also dehumidified and then heated or reheated to extract additional moisture from the articles 22 being processed within a drum 24 of the appliance 10. According to various aspects of the device, the laundry appliance 10 includes a blower 26 that directs the process air 18 through the airflow path 20. The rotating drum 24, which defines the processing space 28, holds articles 22 to be processed, such as through cleaning, rinsing, dehumidification, or other similar laundry-related process. A primary heater 30 is positioned in thermal communication with the airflow path 20 for heating the process air 18. The airflow path 20, in certain aspects of the device can include a single duct that extends continuously through a single path that delivers the process air 18 between the processing space 28 within the rotating drum 24 and the heat pump system or other heat exchange mechanism. As will be described more fully herein, the airflow path 20 can also include separate branches that direct the process air 18 through different components of the appliance 10.

According to certain aspects of the device, one type of primary heater 30 can include a condenser for a heat pump system. The heat pump system includes a condenser and an evaporator, where the evaporator dehumidifies the process air 18 that is delivered from the drum 24 after extracting a certain amount of moisture from the articles 22 being processed. The condenser of the heat pump system rejects thermal energy 14 from a thermal exchange media and directs this thermal energy 14, as heat, into the process air 18 that is delivered from the evaporator and which proceeds to the processing space 28. The heating element 16 can also be in the form of a condenser of an air-to-air heat exchanger as well as an electrically resistive heating element or a gas-powered heating element.

Referring again to FIGS. 1-4, the thermal storage mechanism 12 includes a phase change material 40 that is positioned proximate the heating element 16 and the airflow path 20. This phase change material 40 is included within the thermal storage mechanism 12 and retains thermal energy 14 from at least the heating element 16 and retains this thermal energy 14 as captured heat 42. The captured heat 42 that is directed into the phase change material 40 is excess thermal energy 14 from the heating element 16 that is not directed into the airflow path 20 or the process air 18. Thermal energy 14, which otherwise would have dissipated into the atmosphere, is retained as captured heat 42 within the phase change material 40 for a period of time. The captured heat 42 within the phase change material 40 is utilized during a subsequent laundry cycle or subsequent portion of the same laundry cycle. The appliance 10 also includes a secondary heater 44 that provides thermal energy 14 to at least one of the phase change material 40 and the airflow path 20.

Referring again to FIGS. 1 and 2, the phase change material 40 is positioned adjacent to the primary heater 30 and the airflow path 20. During a drying operation, the primary heater 30 is activated and thermal energy 14 is delivered into the process air 18 moving through the airflow path 20. The phase change material 40 absorbs and retains at least a portion of the thermal energy 14 produced by the primary heating element 16. This thermal energy 14 causes the phase change material 40 to increase in temperature and, in certain circumstances, change phase, such as from solid to liquid, from liquid to gas, or both. The thermal energy 14 that is retained by the phase change material 40 is stored therein as captured heat 42 for a particular period of time. The amount of time that the phase change material 40 retains the thermal energy 14 can depend upon the amount of phase change material 40 and the type of phase change material 40 that is included within the thermal storage mechanism 12. According to the various aspects of the device, the phase change material 40 can include, but is not limited to, at least one of glycol, paraffin wax, a refrigerant, water, air, combinations thereof, and other similar phase change materials 40.

During use of the appliance 10, when the captured heat 42 from the phase change material 40 is needed, process air 18 can be moved through the airflow path 20 or through a separate portion of the airflow path 20 that may flow closer to or through the phase change material 40. Through this process, the captured heat 42 can be transferred from the phase change material 40 and into the process air 18. The primary heater 30 provides a certain amount of thermal energy 14 to the process air 18 to increase the temperature of the process air 18. To further raise the temperature of the process air 18, the captured heat 42 from the phase change material 40 can also be transferred into the process air 18. This transfer of captured heat 42 helps to increase the temperature of the process air 18 an appreciable amount that is not typically achievable using the primary heater 30 and/or the secondary heater 44.

According to certain aspects of the device, the captured heat 42 from the phase change material 40 is used during performance of a quick-dry cycle 50. This quick-dry cycle 50 is usually operated through an increased temperature of the process air 18 that is above a typical temperature of the process air 18 that may be experienced using only the primary heater 30 and/or the secondary heater 44. This increased temperature of the process air 18 absorbs more moisture as the process air 18 moves through the processing space 28 of the drum 24 and over the damp articles 22 being processed. Because the hotter process air 18 brings the drying wet load of articles 22 up to the increased temperature faster and/or retains more moisture, greater amounts of moisture are moved over time and the overall length of the drying cycle can be shortened. Use of the phase change material 40 having the captured heat 42 also provides a mechanism to heat the process air 18 in a shorter period of time.

Figure 2:
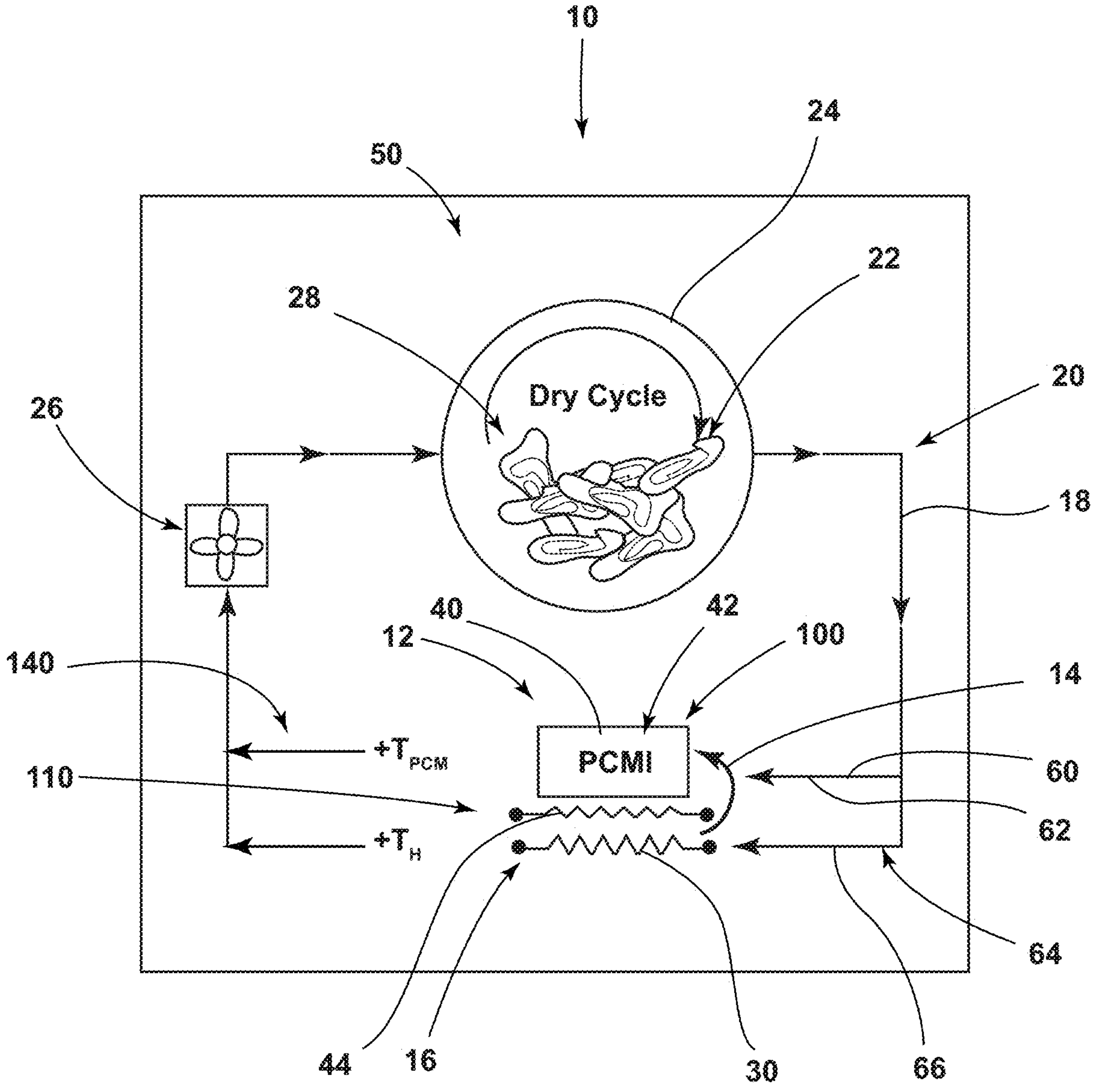
FIG. 2 is a schematic diagram illustrating an aspect of the laundry appliance that includes a heater and a phase change material that are positioned within dedicated portions of an airflow path for heating separate airflows that are delivered to a processing space of the appliance.
Figure 4:
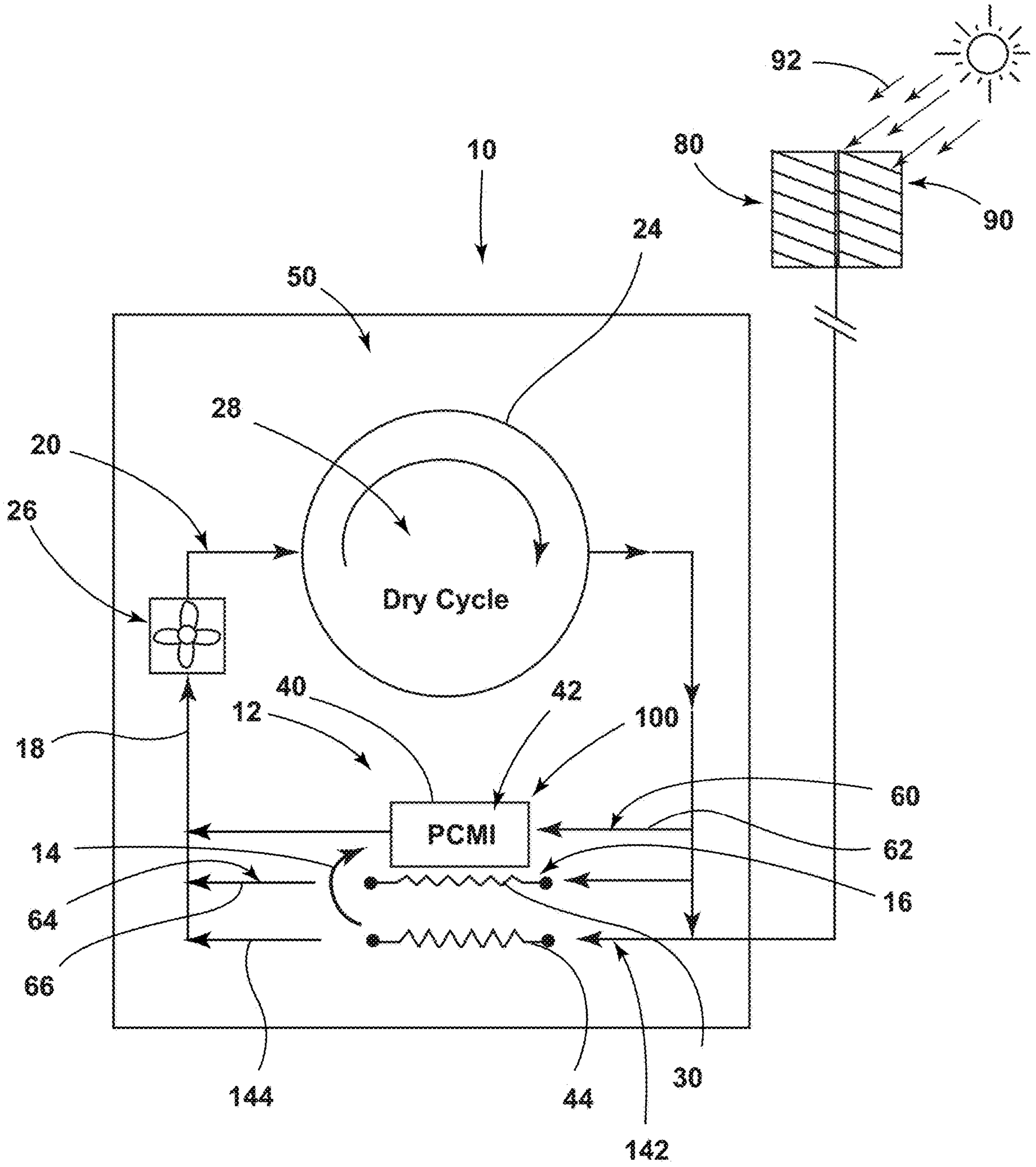
FIG. 4 is a schematic diagram illustrating an appliance that incorporates multiple electric heaters that provide thermal energy to a phase change material, where one of the electric heaters is operated through the use of a renewable energy source.
Figure 5:
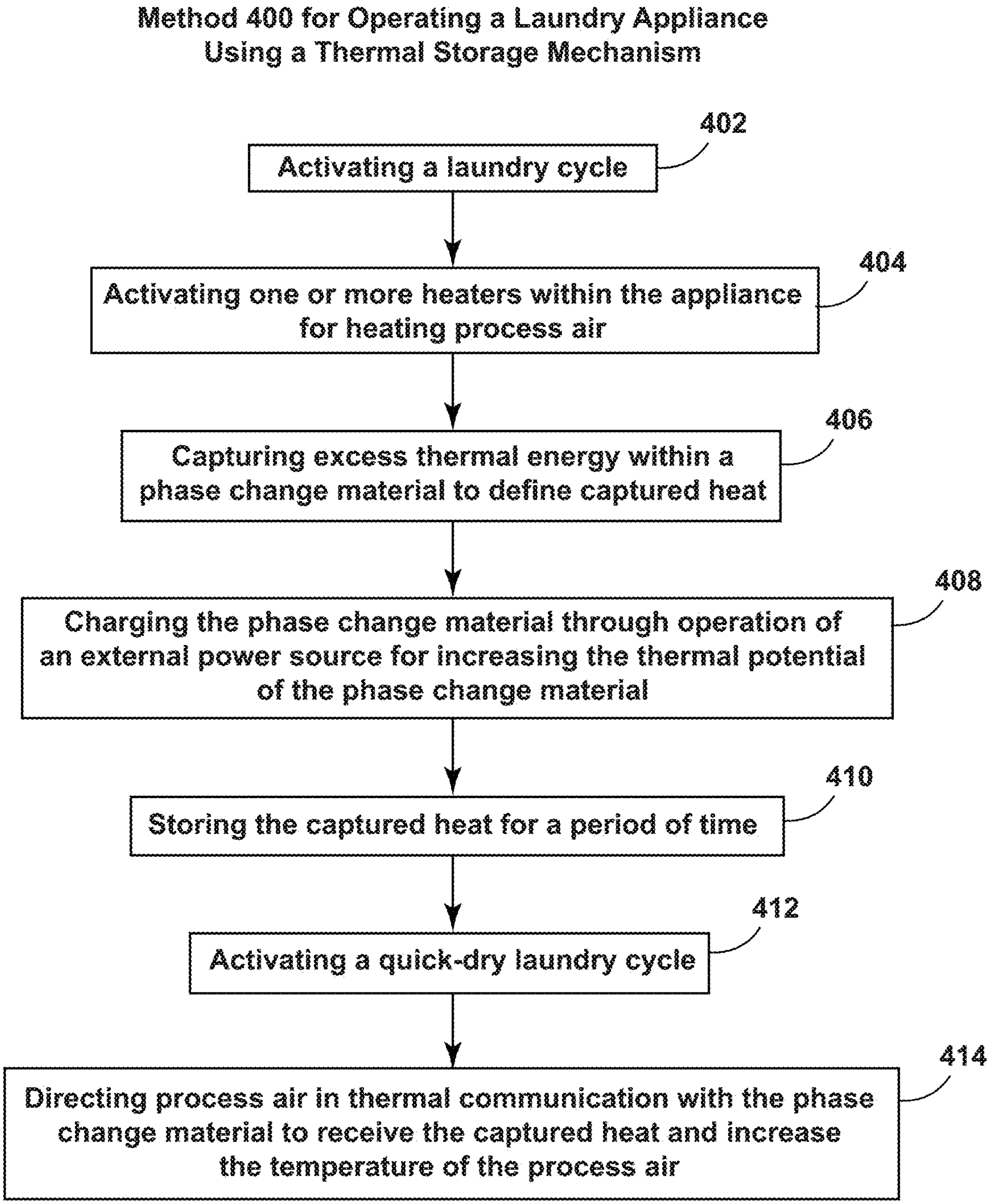
FIG. 5 is a schematic diagram illustrating a method for operating a laundry appliance utilizing a thermal storage mechanism.

According to various aspects of the device, as exemplified in FIGS. 2 and 4, the secondary heater 44 can be in the form of a separate heating mechanism or supplemental heating mechanism that is positioned next to or downstream of the primary heater 30. In instances where the appliance 10 includes a condenser as the primary heater 30, the secondary heater 44 can be utilized for providing additional thermal energy 14 to the process air 18 and the phase change material 40 during laundry settings where the condenser, by itself, may not be able to provide a desired amount of thermal energy 14 to the process air 18. While each of the primary heater 30 and the secondary heater 44 are utilized, thermal energy 14 from these heat sources is directed into the process air 18. Excess thermal energy 14 that may not be directed into the process air 18 is captured by the phase change material 40 and held therein as captured heat 42 for later use.

Referring now to FIGS. 2 and 4, the phase change material 40 can be incorporated within an accessory portion 60 of the airflow path 20. This accessory portion 60, which can be controlled through baffles, deflectors, plates, and other air-handling devices, can be activated to allow an accessory flow 62 of process air 18 to move through the phase change material 40. During typical operation of the laundry appliance 10, process air 18 is moved through a primary portion 64 of the airflow path 20. The accessory portion 60 of the airflow path 20 that moves through the phase change material 40 can be closed off so that the captured heat 42 is generally maintained within the phase change material 40. When the user activates the quick-dry cycle 50, the air handling devices open to allow an accessory flow 62 of the process air 18 to move through the accessory portion 60 of the airflow path 20 and through the phase change material 40. This accessory flow 62 of process air 18 moves through the phase change material 40 and receives at least a portion of the captured heat 42 from the phase change material 40. The temperature of the accessory flow 62 of process air 18 is increased and this now heated accessory flow 62 is combined within the primary flow 66 of process air 18 to be directed into the drum 24. Typically, the primary flow 66 of the process air 18 is heated through use of one or both of the primary heater 30 and the secondary heater 44. Through this operation, the process air 18 delivered to the drum 24 can have a higher temperature through the transfer of heat from the primary heater 30 and/or the secondary heater 44, as well as the phase change material 40.

In certain aspects of the device, the phase change material 40, charged with thermal energy 14, can be utilized for heating the process air 18 during a startup condition. Where a condenser is the primary heater 30, it may take a certain amount of time for the condenser to achieve a heat output necessary for operating the appliance 10. While the condenser charges, captured heat 42 from the phase change material 40 can be utilized for heating the process air 18 at the beginning of a particular drying cycle. As discussed herein, the captured heat 42 within the phase change material 40 is obtained during a previous laundry cycle or through use of an external power source 80.

Figure 3:
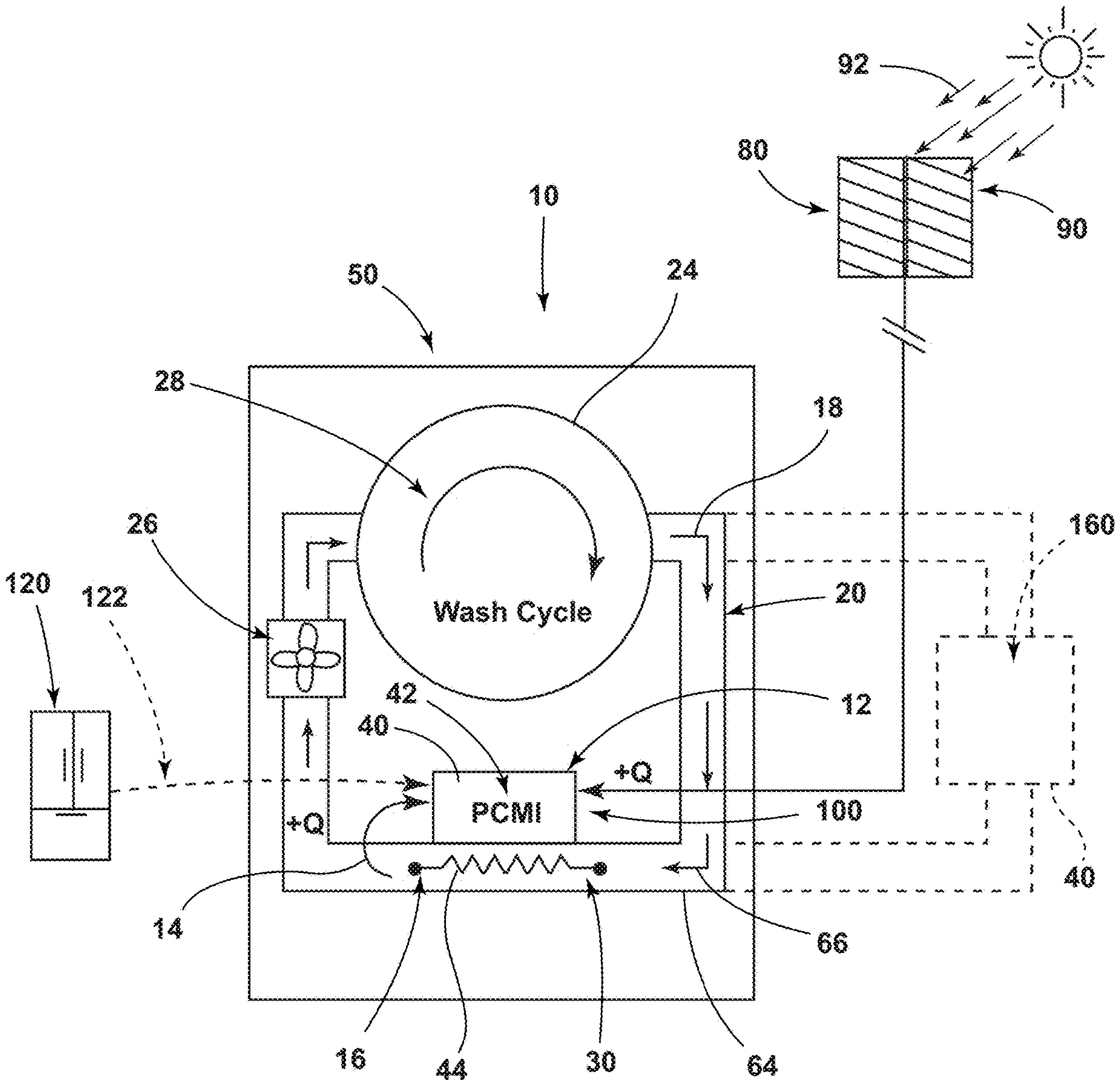
FIG. 3 is a schematic diagram of the laundry appliance of FIG. 1 that includes a renewable energy source for delivering thermal energy to the phase change material.

Referring now to FIG. 3, the phase change material 40 can be charged with thermal energy 14 through an external power source 80. This external power source 80 can be in the form of a solar collector, such as a solar cell 90, that gathers solar energy 92 and delivers this solar energy 92 as thermal energy 14 into the phase change material 40. This thermal energy 14 is retained therein as captured heat 42 that is stored within the phase change material 40 for later use. Through this configuration, a consistent flow of thermal energy 14 can be directed from the external power source 80 and into the phase change material 40. With this consistent flow, the phase change material 40 can be continuously charged and recharged with captured heat 42 through the use of the renewable external power source 80. Accordingly, the phase change material 40 can be continuously charged with thermal energy 14 to be used when needed according to the selections of the user.

Because the phase change material 40 will consistently dissipate a certain amount of thermal energy 14 over time, use of the renewable external power source 80 can be used continuously to add thermal energy 14 to the phase change material 40. Accordingly, the phase change material 40 is continuously charged with the particular level of captured heat 42. This level of captured heat 42 can be described as a heating potential 100 of the phase change material 40. At the conclusion of a particular laundry cycle, combinations of the renewable external power source 80 and the primary and/or secondary heaters 44 can be used for recharging the phase change material 40 to regain a desired heating potential 100 for later use.

Use of the renewable external power source 80 can be in the form of a solar cell 90, solar hot water system, solar collector, wind turbine, geothermal power source, or other similar renewable power source. These renewable external power sources 80 can be used to deliver thermal energy 14 from an external heat source 120 and to the phase change material 40. In certain aspects, the external power source 80 can be used to generate an electrical current that powers a separate recharge heating element 110. This recharge heating element 110 can be used to generate thermal energy 14 that is then transferred to the phase change material 40. In certain aspects of the device, the recharge heating element 110 can be in the form of the primary heater 30, the secondary heater 44 or a separate heater that is dedicated for heating the phase change material 40.

In addition to separate power sources, separate external heat sources 120 within the home can be utilized for delivering thermal energy 14 to the phase change material 40. These external heat sources 120 can be utilized from heat that exhausted from other appliances, such as from a washing machine, refrigerator, oven, dishwasher, or other similar appliance. Certain appliances reject and/or exhaust heat. By way of example, and not limitation, a refrigerator extracts heat from a refrigerating cavity and exhausts or rejects the heat as thermal energy 14 into the surrounding area of the room. This thermal energy 14 can be captured through a thermal transfer system 122 that can direct this thermal energy 14 to the phase change material 40 within the appliance 10. Use of the thermal energy 14 recovered from external heat sources 120 can save time and resources by heating the phase change material 40 so that less electricity or other fuel is needed for heating the process air 18. Additionally, thermal energy 14 expelled by other appliances can be recycled to charge the phase change material 40 of the laundry appliance 10 for achieving the desired heating potential 100. In addition, use of the external power source 80 and the external heat sources 120 can allow for use of a smaller primary heater 30 or secondary heater 44 that have a lower level of energy consumption.

Referring now to FIG. 4, the external power source 80 or renewable energy source can also be used for generating electricity for powering a dedicated heating element 16. According to the various aspects of the device, as described herein, the appliance 10 can include a secondary heater 44. This secondary heater 44, or the primary heater 30, can be powered through the external power source 80, such as one or more of the renewable power sources described herein. In this configuration, the phase change material 40 can absorb excess thermal energy 14 that is generated from operation of the primary heater 30 and the secondary heater 44. Accordingly, one or both of the primary heater 30 and the secondary heater 44 can be powered through renewable or recovered energy. The thermal energy 14 produced using the external power source 80 to power the primary heater 30 and the secondary heater 44 can be transferred into the phase change material 40 for later use.

Referring again to FIG. 4, it is contemplated that the airflow path 20 can include a plurality of branches 140 that can include a primary branch that includes the primary heater 30 and the secondary branch that includes the secondary heater 44. Each of these branches 140 can be directed through a particular heat source for increasing the temperature of process air 18 as it moves through the airflow path 20 and into the processing space 28 of the appliance 10. The primary portion 64 of the airflow path 20 can be used to move a primary flow 66 of the process air 18 through the primary heater 30, which can be used during typical operation of the appliance 10. The secondary heater 44 can be positioned within a secondary portion 142 of the airflow path 20. This secondary portion 142 can be used to move a secondary flow 144 of the process air 18 through the secondary heater 44. As discussed herein, the secondary heater 44 can be powered through the renewable external power source 80 or recovered heat from the external heat source 120 within a particular area.

During certain times of day, the secondary heater 44 may be fully powered through the recovery heat from the external heat source 120 or the renewable external power source 80, or both. During these times of day, the secondary heater 44 can be repurposed as the primary heater 30 for operating various laundry cycles of the appliance 10. At other times of day, when the renewable external power source 80 or the recovered external heat source 120 may not be as plentiful or is unavailable, the primary heater 30 can be utilized.

The phase change material 40 can be positioned within the accessory portion 60 of the airflow path 20. The accessory portion 60 of the airflow path 20 can be used for transferring the captured heat 42 from the phase change material 40 to the accessory flow 62 of process air 18 during a particular portion of a laundry cycle, such as a quick-dry cycle 50 of the appliance 10. As discussed herein, the phase change material 40 receives captured heat 42 from each of the primary and secondary heaters 30, 44. Obtaining this captured heat 42 from the primary and secondary heaters 30, 44 increases the heating potential 100 of the phase change material 40. Also, the secondary heater 44, in addition to providing heat for the process air 18, can also be used for charging the phase change material 40 and increasing the heating potential 100 of the phase change material 40 for later use.

During certain aspects of the device, where a particularly high temperature of the process air 18 may be desired, the appropriate amount of thermal energy 14 can be provided through the primary heater 30, the secondary heater 44 and the phase change material 40. Using all three of these heat sources, a particular amount of thermal energy 14 can be delivered to the process air 18 for achieving a certain temperature of the process air 18. These three heat sources, and others, can be utilized for increasing the temperature of the process air 18 for achieving the quick-dry cycle 50 of the appliance 10, or other dedicated laundry cycle or portion of a laundry cycle.

As discussed herein, use of the renewable external power source 80 or the recovery external heat source 120 from areas around the appliance 10 can be utilized for charging the phase change material 40 and maintaining the heating potential 100 at a desired level. This configuration allows the phase change material 40 to be used at most any time to provide heat to the process air 18 for performing the quick-dry function or other function that requires a significant amount of thermal energy 14. Therefore, the phase change material 40 can be charged with a desirable heating potential 100 after remaining idle for an extended period of time.

According to various aspects of the device, the thermal storage mechanism 12 having the phase change material 40 can be incorporated within the cabinet of the appliance 10. In such an aspect of the device, the phase change material 40 is positioned near the primary heater 30 and/or the secondary heater 44 for the airflow path 20. It is also contemplated that the thermal storage mechanism 12 having the phase change material 40 can be a separate module 160. In this aspect of the device, the thermal storage mechanism 12 can be an external module 160 that is attached to the cabinet for the appliance 10 during manufacture or after installation of the appliance 10.

Where the thermal storage mechanism 12 is an external module 160, the module 160 can be attached to the cabinet so that process air 18 is moved from within the cabinet, through the phase change material 40 positioned within the module 160 and outside the cabinet, and then back into the cabinet for later use. The external module 160 can be utilized or activated for intermittent use, such as during the quick-dry cycle 50. Accordingly, the module 160 can include various baffles, or other air-handling mechanisms that can be opened and closed depending upon the need for a release of the captured heat 42 from the phase change material 40. Accordingly, under typical operation of the appliance 10, the thermal storage mechanism 12 may be closed off from the remainder of the airflow path 20. Where the quick-dry cycle 50 is selected, the baffles or other air handling mechanisms can open so that process air 18 can be moved through the external module 160 having the thermal storage mechanism 12 and the phase change material 40.

Figure 6:
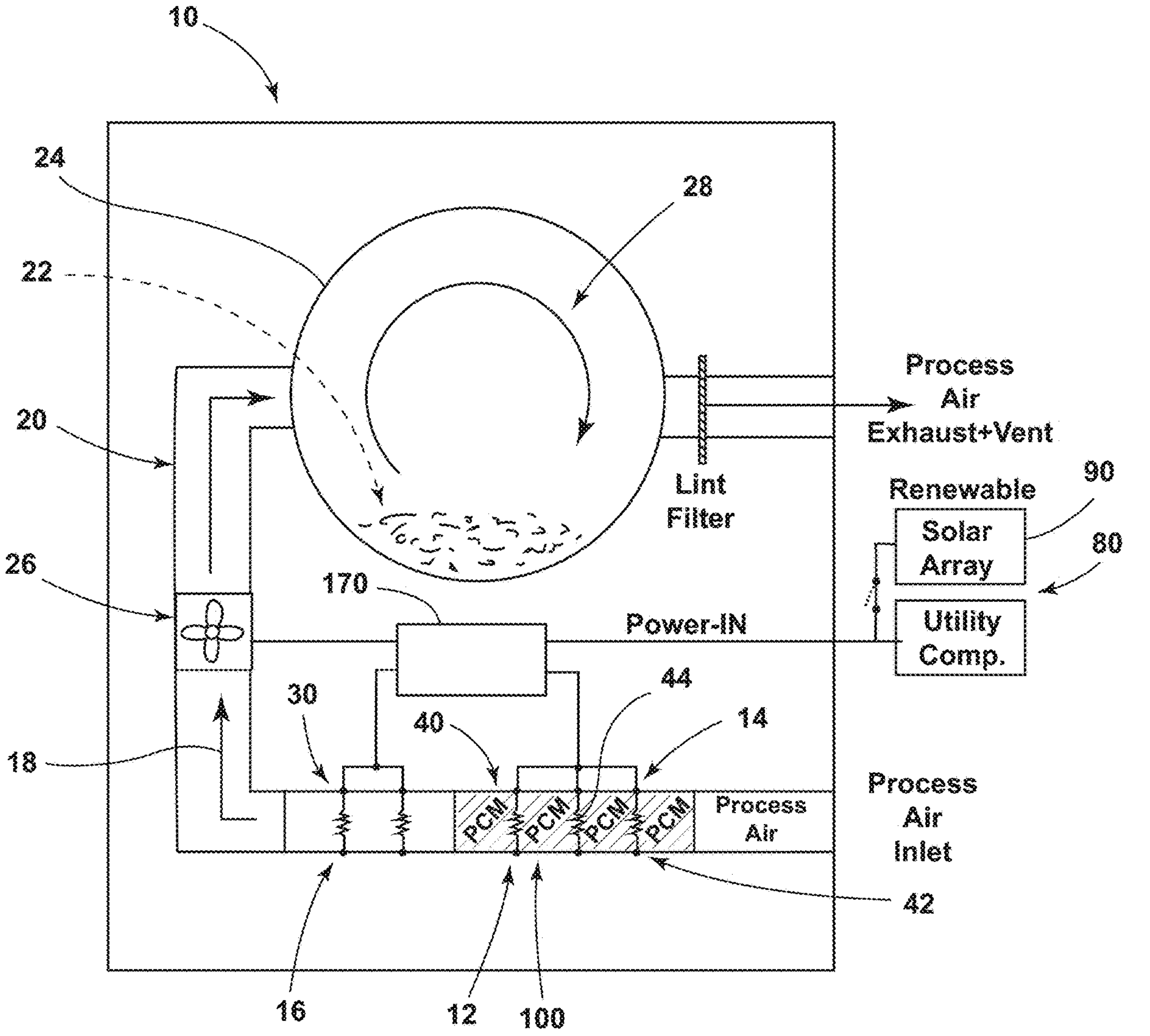
FIG. 6 is a schematic diagram illustrating a laundry appliance that incorporates an aspect of the phase change material of a thermal storage mechanism that is placed in thermal communication with a heat source of the appliance.

Referring now to FIG. 6, the appliance 10 can be in the form of a vented dryer that can be used as a stand-alone dryer or as part of a combination washing and drying appliance 10. The airflow path 20 of the vented appliance 10 can include the primary heater 30 that provides the primary heating interface for the appliance 10. The secondary heater 44 can be positioned within or adjacent to the phase change material 40. The secondary heater 44 provides thermal energy 14 for providing the phase change material 40 with captured heat 42 that can be used during operation of the appliance 10. A controller 170 can be coupled with each of the primary heater 30 and the secondary heater 44 for activating and deactivating the primary heater 30 and the secondary heater 44, respectively. The phase change material 40 can act as a thermal energy storage zone for retaining captured heat 42 that can be used for heating process air 18 during operation of the appliance 10.

During operation of the vented dryer, a typical operation can include the controller 170 instructing the primary heater 30 to provide thermal energy 14 into the process air 18. Additionally, using the phase change material 40 and the secondary heater 44, captured heat 42 can be stored within the phase change material 40 during a separate laundry phase, such as during a washing cycle within a separate washer or within the same combination washing and drying appliance 10. To charge the phase change material 40 to have a heating potential 100, the controller 170 can deliver electrical power to the phase change material 40 using electricity from the electrical grid or by providing energy through the solar cell 90 or other renewable power source. When the phase change material 40 has the appropriate heating potential 100, the controller 170 can instruct the appliance 10 to utilize thermal energy 14 from the phase change material 40.

Where needed, the appliance 10 can also utilize the primary heater 30, such as when additional thermal energy 14 is required for operating the appliance 10. It is also contemplated that the controller 170 can be operated through electrical power from the energy grid or from the renewable power source, such as the solar cell 90. In addition, use of the solar cell 90, or other renewable power source, can operate any one of various systems and mechanisms within the appliance 10. Use of the phase change material 40 allows the process air 18 to be heated before reaching the primary heater 30. Accordingly, less electricity may be needed for operating the primary heater 30 during operation of the appliance 10. The heating potential 100 from the phase change material 40 at least partially heats the process air 18 before reaching the primary heater 30.

Figure 7:
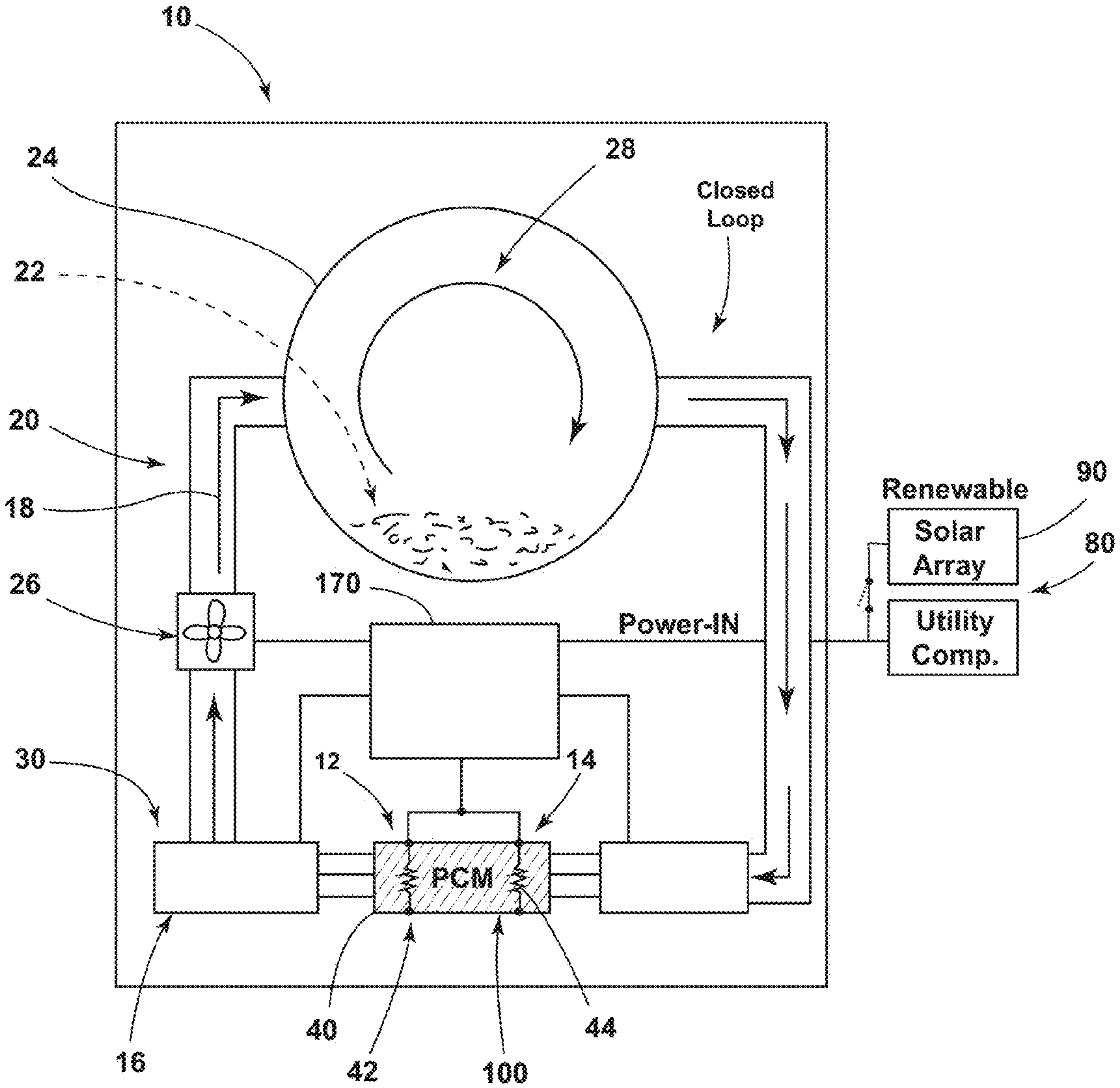
FIG. 7 is a schematic diagram illustrating a laundry appliance that incorporates an aspect of the phase change material of a thermal storage mechanism that is placed in thermal communication with a heat source of the appliance.

Referring now to FIG. 7, the phase change material 40 can also be used within a closed-loop air flow path 20, where the process air 18 is recycled through the airflow path 20. The controller 170 can be utilized for operating the evaporator (shown upstream of the phase change material 40), the condenser 30 and the secondary heater 44 that is positioned within or adjacent to the phase change material 40. As discussed above, the renewable power source, such as the solar cell 90, can be used for providing electrical power to the controller 170 as well as the individual components of the airflow path 20 for the appliance 10.

As discussed herein, the controller 170 can operate the evaporator and the condenser to provide a conventional operation of the appliance 10. Various amounts of thermal energy 14 can be stored within the phase change material 40 through use of the renewable power source, such as the solar cell 90. Additionally, the renewable power source can also be used for operating the controller 170 as well as other electrical components of the appliance 10. Charging of the phase change material 40 can occur through use of the renewable power source so that the heating potential 100 is maintained at a particular level until such time as the captured heat 42 is needed for heating the process air 18 moving through the airflow path 20. It is also contemplated that the phase change material 40 can be charged during operation of a separate washing cycle. In this manner, as laundry is being washed, the secondary heater 44 can be operated to charge the phase change material 40 to achieve a desired heating potential 100. The captured heat 42 can then be delivered into the process air 18 during operation of a subsequent cycle of the appliance 10.

As discussed herein, use of the phase change material 40 having the captured heat 42 is typically utilized upstream of the primary heater 30. In this manner, use of the heating potential 100 of the phase change material 40 can provide an initial amount of thermal energy 14 to the process air 18. With the process air 18 being preheated, use of the primary heater 30 can be more efficient or can utilize less electricity for transferring additional thermal energy 14 into the process air 18.

According to various aspects of the device, the phase change material 40 can be in the form of paraffin wax, water, air, refrigerant, or other similar material that is able to receive and retain thermal energy 14 fora desired period of time.

Referring now to FIGS. 1-7, having described various aspects of the device, a method 400 is disclosed for operating an appliance 10 having a thermal storage mechanism 12. According to the method 400, step 402 includes activating a laundry cycle for the appliance 10. Step 404 includes activating a primary heating element 16 for heating process air 18 within an airflow path 20. Step 406 includes capturing excess thermal energy 14 within a phase change material 40 positioned near the airflow path 20 and the primary heater 30. Step 408 includes charging the phase change material 40 through operation of an external renewable power source for increasing the thermal potential of the phase change material 40. Step 410 includes storing the captured heat 42 for a predetermined period of time. Step 412 includes operating a quick-dry cycle 50 of the appliance 10. Step 414 includes directing process air 18 to be in thermal communication with the phase change material 40 to receive the captured heat 42 and increase the temperature of the process air 18.

According to various aspects of the device, the thermal storage mechanism 12 can be utilized within any one of various appliances 10. Such appliances 10 can include drying appliances, combination washing and drying appliances, laundry refreshing appliances and other similar appliances. Also, aspects of the thermal storage mechanism 12 can be used for capturing and recycling heat from any one or more of various appliances 10. Such appliances 10 can include laundry appliances, dishwashers, refrigerating appliances, ovens, air handling units, water heaters, and other similar appliances, where thermal exchanges and capture of thermal energy 14 can be utilized.

The invention disclosed herein is further summarized in the following paragraphs and is further characterized by combinations of any and all of the various aspects described therein.

According to an aspect of the present disclosure, a laundry appliance includes a blower that directs process air through an airflow path. A rotating drum holds articles to be processed. A heat pump system has a condenser and an evaporator. The evaporator dehumidifies the process air that is delivered from the drum and the condenser heats the process air that is delivered from the evaporator. A thermal storage mechanism retains heat at least from the condenser that is directed away from the process air to define captured heat, and the captured heat of the thermal storage mechanism is utilized during a subsequent laundry cycle. A secondary heater is powered by an external source that delivers thermal energy to the thermal storage mechanism.

According to another aspect, the secondary heater is an electrically resistive heating element that is powered by a renewable power source.

According to another aspect, the external source includes a renewable power source. Electronic components of said appliance are at least partially powered by the renewable power source.

According to another aspect, the thermal storage mechanism includes a phase change material.

According to another aspect, the renewable power source is a solar cell.

According to another aspect, the external source is external heat that is exhausted from a separate appliance.

According to another aspect, the airflow path includes a single duct that extends between a processing space within the rotating drum and the heat pump system.

According to another aspect, the secondary heater is positioned adjacent to the phase change material. The secondary heater is in thermal communication with the phase change material and the airflow path.

According to another aspect, the secondary heater is alternatively and selectively operated by at least one of a renewable power source, external heat that is exhausted from a separate appliance, and an electrically resistive heating element.

According to another aspect, the captured heat is utilized during one of a startup condition of a subsequent laundry cycle and a quick-dry function of the subsequent drying cycle.

According to another aspect, the airflow path proximate the phase change material includes a primary branch and a secondary branch. The secondary branch is utilized for delivering the captured heat from the phase change material to the airflow path via the secondary branch.

According to another aspect, the primary branch is continuously used during operation of the blower.

According to another aspect, the phase change material includes at least one of glycol, paraffin wax, and a refrigerant.

According to another aspect, the renewable power source, the external heat exhausted from the separate appliance, and the electrically resistive heating element are selectively operated by a controller.

According to another aspect, the electrically resistive heating element is operated when each of the renewable power source and the external heat are unavailable.

According to another aspect of the present disclosure, a laundry appliance includes a blower that directs process air through an airflow path. A rotating drum holds articles to be processed. A heating assembly delivers heat to the process air that is delivered to the rotating drum. A phase change material retains heat at least from the heating assembly that is directed away from the process air to define captured heat. The captured heat of the phase change material is utilized during a subsequent laundry cycle. A secondary heater is powered by an external source that delivers thermal energy to the phase change material.

According to another aspect, the external source includes at least one of a renewable power source and external heat that is exhausted from a separate appliance.

According to another aspect, the external source includes a renewable power source, and electronic components of said appliance are at least partially powered by the renewable power source.

According to another aspect, the renewable power source is a solar cell.

According to another aspect of the present disclosure, a method for operating a laundry appliance includes the steps of activating a blower for delivering process air to a processing space, activating a primary heating element, capturing excess thermal energy from the primary heating element within a phase change material, further charging the phase change material through accumulating captured heat from an external source within the phase change material, storing the captured heat within the phase change material for a period of time, activating a subsequent drying cycle, and delivering the captured heat from the phase change material into the process air for operating the subsequent drying cycle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:

a blower that directs process air through an airflow path;

a rotating drum that holds articles to be processed;

a heat pump system having a condenser and an evaporator, wherein the evaporator dehumidifies the process air delivered from the drum and wherein the condenser heats the process air delivered from the evaporator;

a thermal storage mechanism that retains captured heat at least from the condenser that is not directed into the process air, and wherein the captured heat of the thermal storage mechanism is utilized during a subsequent laundry cycle; and a secondary heater powered by an external source that delivers thermal energy to the thermal storage mechanism.

2. The laundry appliance of claim 1, wherein the secondary heater is an electrically resistive heating element that is powered by a renewable power source.

3. The laundry appliance of claim 1, wherein the external source includes a renewable power source, wherein electronic components of said appliance are at least partially powered by the renewable power source.

4. The laundry appliance of claim 1, wherein the thermal storage mechanism includes a phase change material.

5. The laundry appliance of claim 3, wherein the renewable power source is a solar cell.

6. The laundry appliance of claim 1, wherein the external source is external heat that is exhausted from a separate appliance.

7. The laundry appliance of claim 1, wherein the airflow path includes a single duct that extends between a processing space within the rotating drum and the heat pump system.

8. The laundry appliance of claim 4, wherein the secondary heater is positioned adjacent to the phase change material, wherein the secondary heater is in thermal communication with the phase change material and the airflow path.

9. The laundry appliance of claim 8, wherein the secondary heater is alternatively and selectively operated by at least one of a renewable power source, external heat that is exhausted from a separate appliance, and an electrically resistive heating element.

10. The laundry appliance of claim 1, wherein the captured heat is utilized during one of a startup condition of a subsequent laundry cycle and a quick-dry function of the subsequent drying cycle.

11. The laundry appliance of claim 4, wherein the airflow path proximate the phase change material includes a primary branch and a secondary branch, wherein the secondary branch is utilized for delivering the captured heat from the phase change material to the airflow path via the secondary branch.

12. The laundry appliance of claim 11, wherein the primary branch is continuously used during operation of the blower.

13. The laundry appliance of claim 4, wherein the phase change material includes at least one of glycol, paraffin wax, and a refrigerant.

14. The laundry appliance of claim 9, wherein the renewable power source, the external heat that is exhausted from the separate appliance, and the electrically resistive heating element are selectively operated by a controller.

15. The laundry appliance of claim 14, wherein the electrically resistive heating element is operated when each of the renewable power source and the external heat are unavailable.

16. A laundry appliance comprising:

a blower that directs process air through an airflow path;

a rotating drum that holds articles to be processed;

a heating assembly that delivers heat to the process air that is delivered to the rotating drum;

a phase change material that retains captured heat at least from the heating assembly that is not directed into the process air, and wherein the captured heat of the phase change material is utilized during a subsequent laundry cycle; and a secondary heater powered by an external source that delivers thermal energy to the phase change material.

17. The laundry appliance of claim 16, wherein the external source includes at least one of a renewable power source and external heat that is exhausted from a separate appliance.

18. The laundry appliance of claim 16, wherein the external source includes a renewable power source, wherein electronic components of said appliance are at least partially powered by the renewable power source.

19. The laundry appliance of claim 17, wherein the renewable power source is a solar cell.

20. A method for operating a laundry appliance, the method comprising steps of:

activating a blower for delivering process air to a processing space;

activating a primary heating element;

capturing excess thermal energy from the primary heating element within a phase change material;

further charging the phase change material through accumulating captured heat from an external source within the phase change material;

storing the captured heat within the phase change material for a period of time;

activating a subsequent drying cycle; and delivering the captured heat from the phase change material into the process air for operating the subsequent drying cycle.

* * * * *